(12) United States Patent
Sprenger et al.

(10) Patent No.: US 9,496,692 B2
(45) Date of Patent: Nov. 15, 2016

(54) FRAME FOR CABLE FEEDTHROUGH SYSTEMS AND FRAME PARTS THEREFOR

(75) Inventors: Dennis Sprenger, Horn-Bad Meinberg (DE); Jens Andersen, Blomberg (DE); Wolfgang Rass, Paderborn (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 28 days.

(21) Appl. No.: 13/821,607

(22) PCT Filed: Sep. 9, 2011

(86) PCT No.: PCT/EP2011/065649
§ 371 (c)(1),
(2), (4) Date: May 21, 2013

(87) PCT Pub. No.: WO2012/032156
PCT Pub. Date: Mar. 15, 2012

(65) Prior Publication Data
US 2013/0228657 A1    Sep. 5, 2013

(30) Foreign Application Priority Data
Sep. 10, 2010  (DE) .................. 10 2010 037 465

(51) Int. Cl.
| F16M 13/00 | (2006.01) |
| H02G 3/08 | (2006.01) |
| H02G 3/22 | (2006.01) |

(52) U.S. Cl.
CPC ............... *H02G 3/08* (2013.01); *H02G 3/083* (2013.01); *H02G 3/22* (2013.01)

(58) Field of Classification Search
CPC ............................... H02G 3/22; F16L 3/2235
USPC ................. 248/56, 68.1, 74.1, 49; 174/656; 211/194
See application file for complete search history.

(56) References Cited

U.S. PATENT DOCUMENTS

| 4,601,447 A * | 7/1986 | McFarland ..................... 248/49 |
| 7,175,138 B2 * | 2/2007 | Low ....................... H02G 3/263 24/455 |

FOREIGN PATENT DOCUMENTS

| CN | 1697276 A | 11/2005 |
| DE | 44 34 202 A1 | 9/1995 |

(Continued)

OTHER PUBLICATIONS

2nd office action issued for Chinese application No. 201180042807.6 mailed Dec. 29, 2015.

*Primary Examiner* — Steven Marsh
(74) *Attorney, Agent, or Firm* — Nath, Goldberg & Meyer; Jerald L. Meyer

(57) ABSTRACT

The invention relates to a frame (1) for cable feedthrough systems. The frame (1) has a first frame part (10, 30) and a second frame part (10', 30'), wherein each frame part (10, 10', 30, 30') has a recess (19, 19', 39, 39') and a projection (18, 18', 38, 38'). The projection (18; 38) of the first frame part (10, 30) is suitably embodied for being inserted into the recess (19', 39') of the second frame part (10'; 30'), and the projection (18', 38') of the second frame part (10', 30') is suitably embodied for being inserted into the recess (19, 39) of the first frame part (10, 30). The first frame part (10, 30) further has a locking member (11, 31), and the second frame part (10', 30') further has a locking member (11', 31'), wherein the locking members (11, 11', 31, 31') in the assembled state may detachably connect the first frame part (10, 30) with the second frame part (10', 30'), wherein the locking members (31, 31') have latch fasteners, or wherein the locking members (11, 11') have sliding members. Furthermore, the invention also provides frame parts (10, 10'; 30, 30').

18 Claims, 9 Drawing Sheets

(56) References Cited

FOREIGN PATENT DOCUMENTS

| DE | 694 18 898 T2 | 12/1999 |
| DE | 199 59 185 A1 | 6/2001 |
| DE | 603 11 258 T2 | 7/2007 |
| WO | 99/06747 A1 | 2/1999 |
| WO | WO 0142046 A3 * | 12/2001 |
| WO | 2009/022960 A1 | 2/2009 |

* cited by examiner

FRAME FOR CABLE FEEDTHROUGH SYSTEMS AND FRAME PARTS THEREFOR

This is a National Phase Application filed under 35 U.S.C. §371 as a national stage of International Application No. PCT/EP2011/065649, filed Sep. 9, 2011, claiming the benefit from German Patent Application No. 10 2010 037 465.2, filed Sep. 10, 2010, the entire content of each of which is hereby incorporated by reference in its entirety.

The invention relates to a frame for cable feedthrough systems and frame parts therefore.

Numerous frames for cable feedthrough systems are known from prior art.

These frames are constructed of several part components, and usually have locking members or screw connections.

The known part components usually contain various part components such that the production is cost-intensive and the installation is prone to errors.

Locking members require that the material is relatively elastic so that an insertion is even possible, however, so that a release also becomes possible at a later time.

However, this elasticity also leads to the frames being rather elastic overall, and are thus easily deformed.

If cables are incorporated in the cable feedthrough system, twisting often occurs, which may bring about the release of the lock.

Screw connections require the use of tools. In addition to the increased expense and time-consuming installation, it has been shown in the past that with an incorrect installation of the frame parts using the wrong tools, the frame parts are either not fixed properly, or are damaged. Furthermore, a slippage of a tool during installation may also damage a cable.

The object of the invention is therefore a frame for cable feedthrough systems and parts therefore, solving one or more disadvantages of prior art in an inventive manner.

The object is solved by means of a frame for cable feedthrough systems, having a first frame part and an equally shaped second frame part.

Each frame part has a recess and a projection.

The projection of the one frame part is suitably embodied for being inserted into a recess of the other frame part.

Furthermore, the frame parts have locking members which in their assembled state detachably connected the first frame part to the second frame part, wherein the locking members have latch fasteners, or wherein the locking members have sliding members.

In one embodiment of the invention the first frame part and the second frame part are embodied identically.

In a further embodiment of the invention the frame parts enable a pre-centering during the assembly of the same into a frame.

In yet a further embodiment of the invention the frame is made from a plastic or from metal.

According to a further embodiment of the invention the frame has fastening devices for the installation of the same on a housing.

In one embodiment of the invention the locking members lock each of the projections in the respective recess.

In yet another embodiment of the invention the frame parts each have a dedicated locking recess and one locking projection for locking.

The task is also solved by means of frame parts of a frame of a cable feedthrough system, wherein the frame has a first frame part and a second frame part. For this purpose the frame part according to the invention has a recess and a projection. The projection of the frame part is suitably embodied for being inserted into an equally shaped recess of a second frame part, and the recess of the frame part is suitably embodied for receiving an equally shaped projection of the second frame part. The frame part further has a locking member which in the assembled state of the frame detachably connects the frame part to the second frame part, wherein the locking members have latch fasteners, or wherein the locking members have sliding members.

In one embodiment of the invention the frame part enables a pre-centering during the assembly of the frame.

In a further embodiment of the invention the frame part is made from a plastic or from a metal.

In yet another embodiment of the invention the frame part has fastening devices for an installation on a housing.

According to yet another embodiment of the invention the locking member locks the projection of the second frame part in the recess.

In yet another embodiment of the invention the frame part has a separate recess and a separate projection for interlocking with the second frame part, which undetachably hold the frame parts in their locked state.

According to a further embodiment of the invention the frame part further has bars, wherein the bars are embodied such that they are suitable for receiving cable feedthroughs from various directions.

In yet another embodiment of the invention the frame part has one or more gear tooth systems.

According to a further embodiment of the invention the frame part further has at least one receiving recess for receiving locking members.

In yet another embodiment of the invention the frame part further has at least one stiffening member.

The invention is explained in further detail below by referencing the figures.

They show:

FIG. 1 a first perspective schematic illustration of the frame and the frame parts according to a first embodiment of the invention during the assembly of frame parts, FIG. 2 a second perspective schematic illustration of a frame and frame parts according to a first embodiment of the invention during the locking of the frame parts, FIG. 3 a third perspective schematic illustration of a frame and frame parts according to a first embodiment of the invention in the locked state, FIG. 4 a further perspective schematic illustration of a frame part according to a first embodiment of to the invention in the locked state, FIG. 5 a perspective schematic illustration of a frame part according to a first embodiment of the invention, FIG. 6 a detail from FIG. 5

FIG. 7 a first perspective schematic illustration of the frame and frame parts according to a second embodiment of the invention during the assembly of the frame parts, FIG. 8 a second perspective schematic illustration of the frame and frame parts according to a second embodiment of the invention during the locking of the frame parts, FIG. 9 a further perspective schematic illustration of a frame part according to a second embodiment of the invention during the locking of the frame parts, FIGS. 10 to 12 schematic illustrations at a top view of the frame and frame parts according to a second embodiment of the invention during assembly, FIG. 13 a further perspective schematic illustration of a frame part representing a further detail of the invention, FIG. 14 a further perspective schematic illustration of a frame part representing a further detail of the invention, FIG. 15 a further perspective schematic illustration of a frame part representing a further detail of the invention, and FIG. 16 a further perspective schematic illustration of a frame part representing a further detail of the invention.

FIG. 1 shows a first perspective schematic illustration of the frame 1 and frame parts 10, 10' according to a first embodiment of the invention during the assembly of frame parts.

In this embodiment the frame 1 for cable feedthrough systems has a first frame part 10 and a second frame part 10'.

Each frame part 10, 10' has a recess 19, 19' and a projection 18, 18'.

The projection 18 of the first frame part 10 is suitably embodied for being inserted into the recess 19 of the second frame part 10. Accordingly, the projection 18' of the second frame part 10' is suitably embodied for being inserted into the recess 19 of the first frame part 10.

Furthermore, the first frame part 10 has a locking member 11, and the second frame part 10' has a locking member 11', wherein the locking members 11, 11', in the assembled state—as shown in FIGS. 3 and 4—may detachably connect the first frame part 10 to the second frame part 10'.

The cable feedthrough, or cable sleeve 20, respectively, is held in the frame 1. The same is the object of another application, and is herein incorporated with reference to the additional application.

During the assembly of the frame 1 from the frame parts 10, 10', the projections 18, 18' are initially alternately guided into the recesses 19, 19'. This arrangement of the projections 18, 18' and recesses 19, 19' allows a pre-centering to take place such that the frame parts—which may be embodied identically in the present invention—may be safely connected to each other. This insertion action is illustrated by the arrows shown laterally in FIG. 1.

Subsequently, as shown in FIG. 2, the locking members 11, 11' are actuated. This actuation process may lead to another pulling motion such that the frame parts are pulled toward each other. By the inserting and the pulling during the locking process, tension may be built up such that the cable sleeves 20 are also pressurized such that an improved sealing may be achieved. This action of pulling together will be explained in further detail below, referencing FIGS. 5 and G.

After the actuation has been completed, the frame 1 is constructed from the frame parts 10, 10' and the connection is detachable in reverse order. Such a completed frame is illustrated in FIG. 3 and FIG. 4. For this purpose a view of a top is illustrated in FIG. 3, while FIG. 4 shows a view of the bottom. As can easily be seen in FIG. 4, the frame parts may also have additional recesses which are embodied such that the stability and density of the frame is ensured while simultaneously saving material.

With the embodiment according to the invention it is achieved that a reliable connection of frame parts is possible. The connection itself is detachable. Furthermore, no tools are required for making the connection such that the ease of installation and disassembly is significantly improved as opposed to the solutions according to prior art.

Furthermore, the frame parts 10 and 10' may be embodied identically such that only one production process is necessary in a cost-effective manner.

FIG. 5 shows a perspective schematic illustration of a frame part 10' according to a first embodiment of the invention, wherein FIG. 6 shows a detail thereof.

The frame part 10' has a projection 18'. Upon assembly, the same is inserted into a recess 19 of another (not illustrated) frame part 10. This frame part has a locking member 11. The locking member 11 has one or more stop surfaces 14, which are embodied in an angular manner. Furthermore, the locking member 11 has one or more holding surfaces 15. The projection 18' in turn has one or more recesses 16, which are embodied such that they interact with the angular stop surfaces 14 and holding surfaces 15. For this purpose the projection 18 is threaded through the recess 16 and the angular stop surfaces 14 in a rail-like manner in a first step during locking, and is subsequently pulled together through the angular stop surface 14 during the continued locking process. The holding surface 15 then prevents any sliding off of the now locked frame parts 10, 10' by means of static friction.

Additionally, one or more spring arms 17 may also be provided on the frame parts 10, 10'. These may be compressed in suitable recesses 13'. For this purpose an end position of the locking members 11, 11' may be defined.

In this first embodiment the locking members 11, 11' are embodied as sliding members.

In this second embodiment the frame 1 for cable feedthrough systems has a first frame part 30 and a second frame part 30'.

Each frame part 30, 30' has a recess 39, 39' and a projection 38, 38'.

The projection 38 of the first frame part 30 is suitably embodied for being inserted into the recess 39 of the second frame part 30. Accordingly, the projection 38' of the second frame part 30' is suitably embodied for being inserted into the recess 39 of the first frame part 30.

Figure 12:
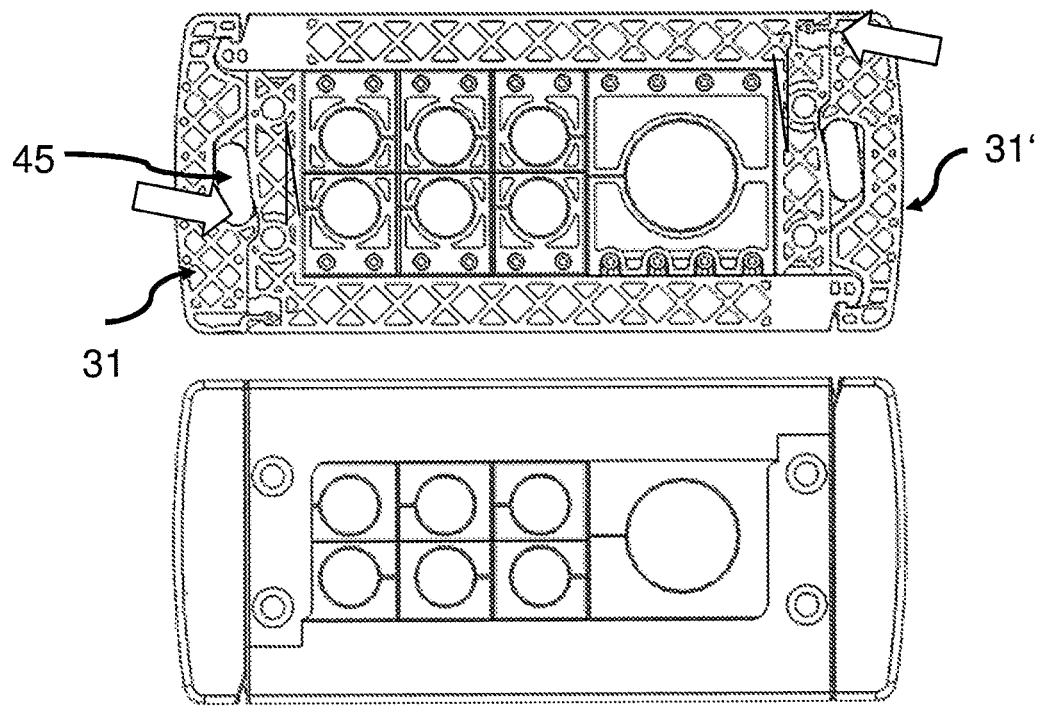

The first frame part 30 further has a locking member 31 and the second frame part 30' has a locking member 31', wherein the locking members 31, 31' in their assembled state—as shown in FIG. 12—may detachably connect the first frame part 30 to the second frame part 30'.

The cable feedthrough, or the cable sleeve 20, respectively, is held in the frame 1. The same is the object of a further application, and is incorporated herein, referencing the further application.

Figure 10:
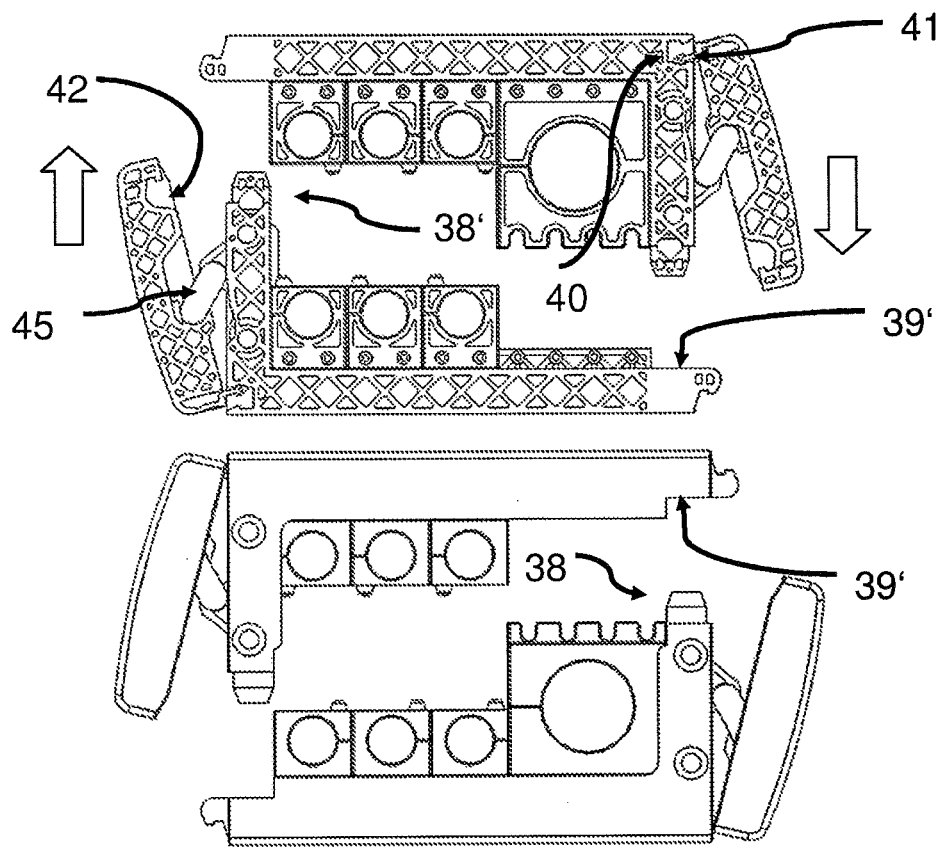

During the assembly of the frame 1 from the frame parts 30, 30', the projections 38, 38' are initially alternately guided into the recesses 39, 39'. This arrangement of the projections 38, 38' and recesses 39, 39' allows a pre-centering to take place such that the frame parts—which may be embodied identically in the present invention—may be safely connected to each other. This insertion action is illustrated by the arrows shown laterally in FIG. 10.

Figure 11:
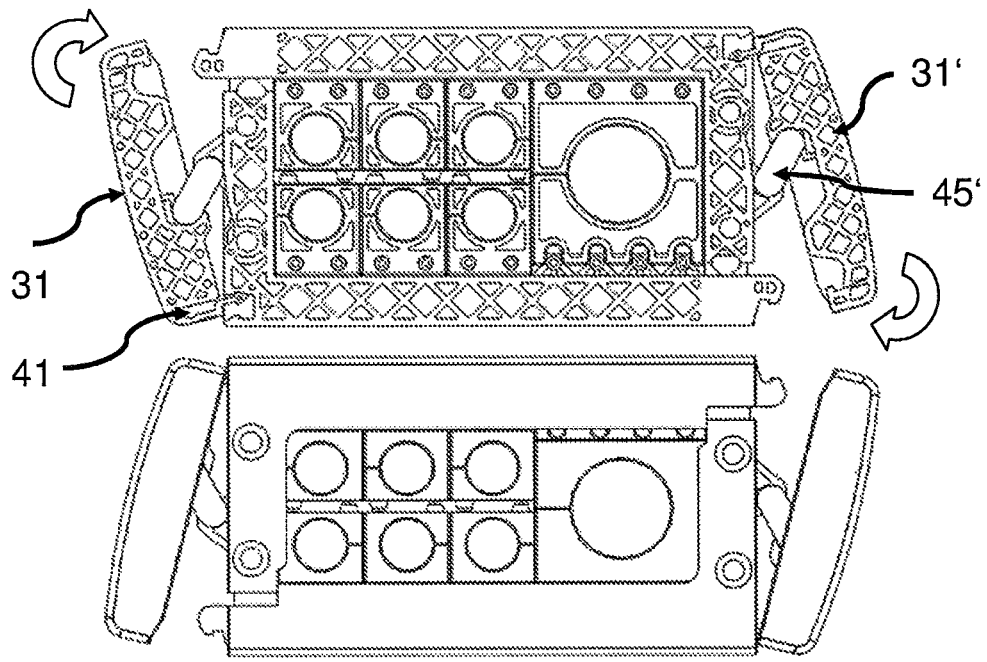

Subsequently, the locking members 31, 31' are actuated as shown in FIG. 11. This actuation process may lead to an additional pulling motion such that the frame parts are pulled toward each other. By the inserting and the pulling during the locking process, tension may be built up such that the cable sleeves 20 are also pressurized such that an improved sealing may be achieved.

Figure 1:
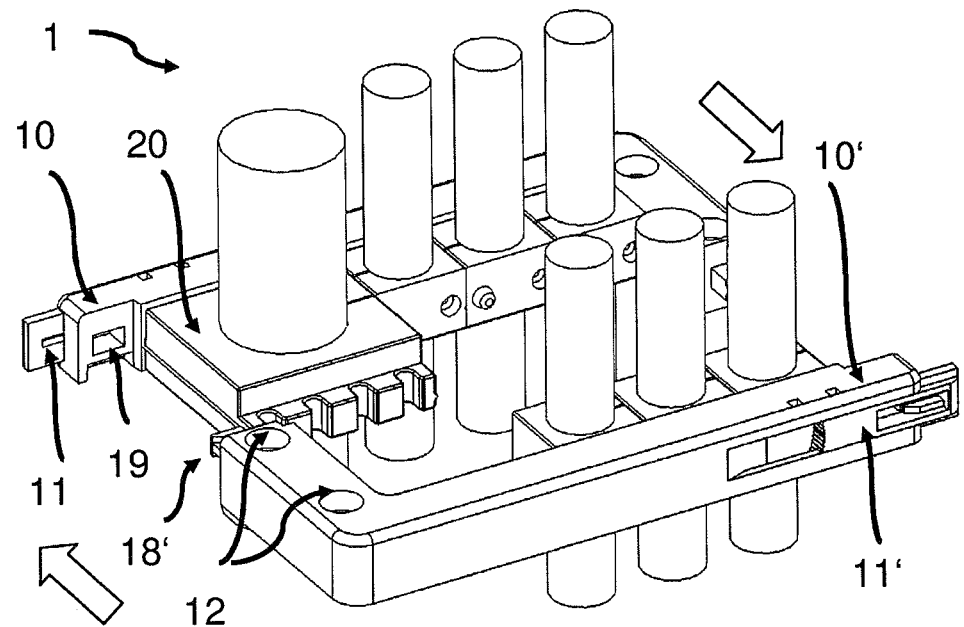
FIG. 1 shows a first perspective schematic illustration of the frame 1 and the frame parts 10, 10' according to a first embodiment of the invention during the assembly of frame parts.
Figure 2:
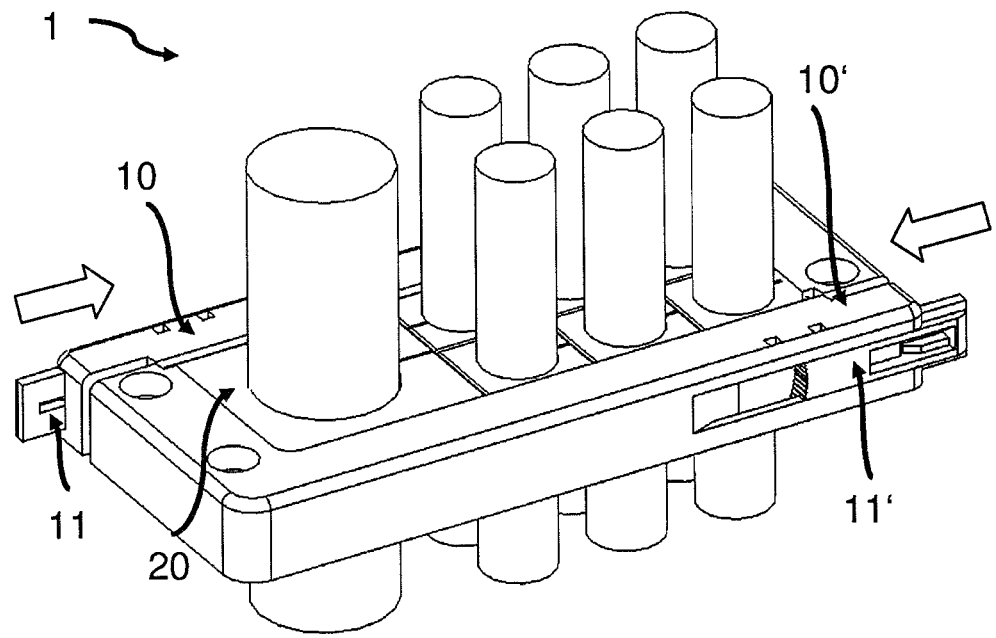
Figure 3:
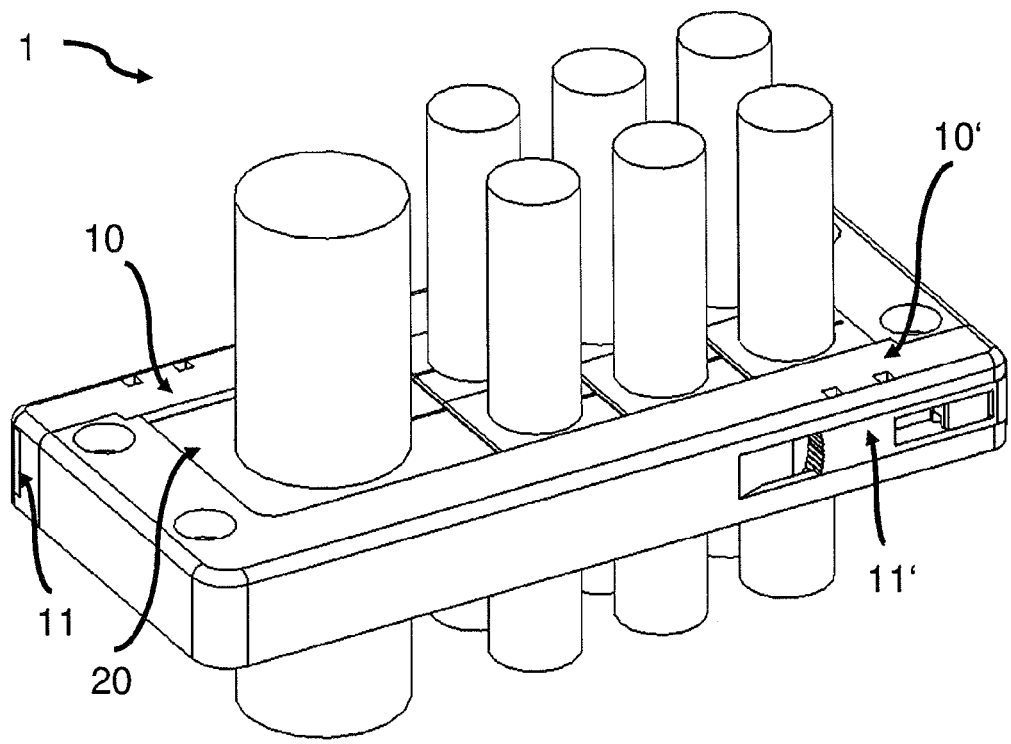
Figure 4:
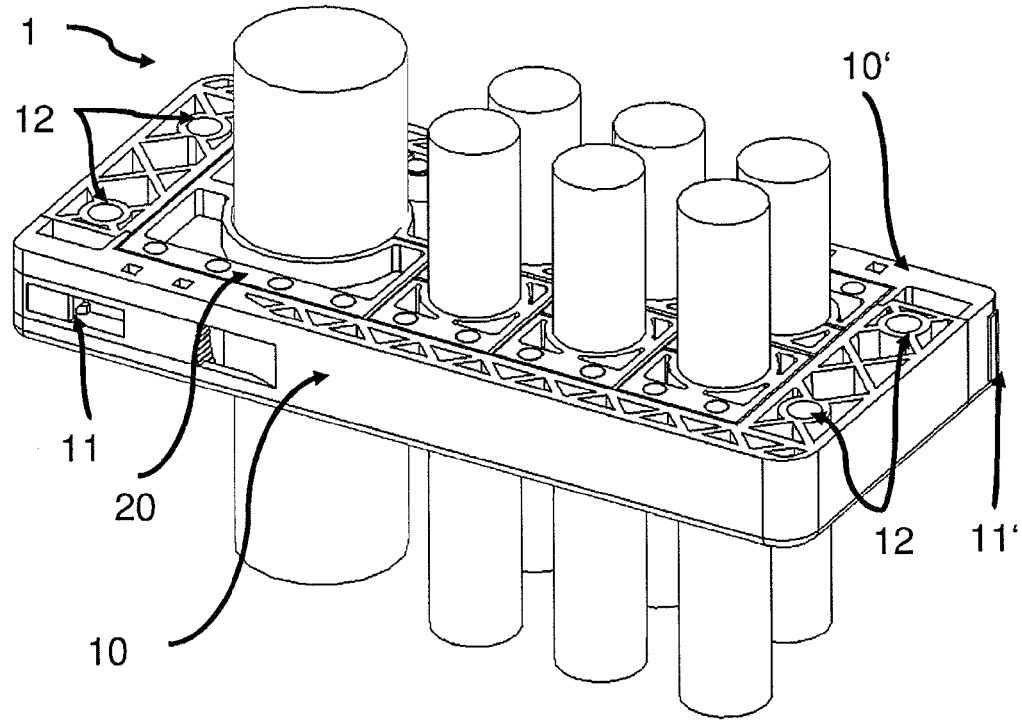
Figure 5:
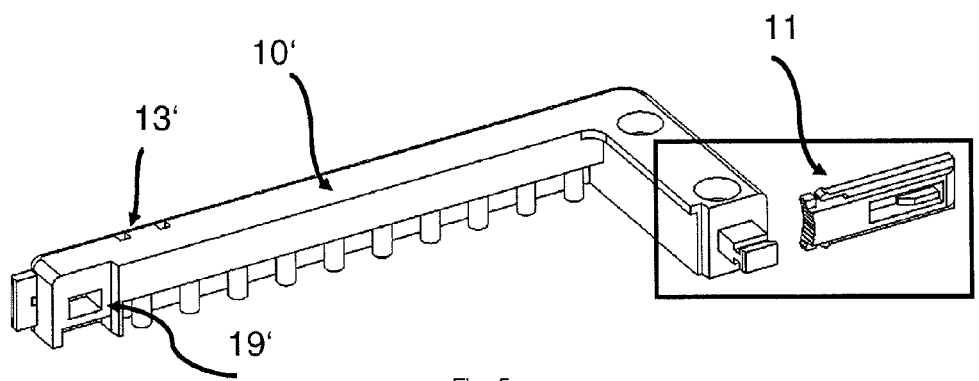
Figure 6:
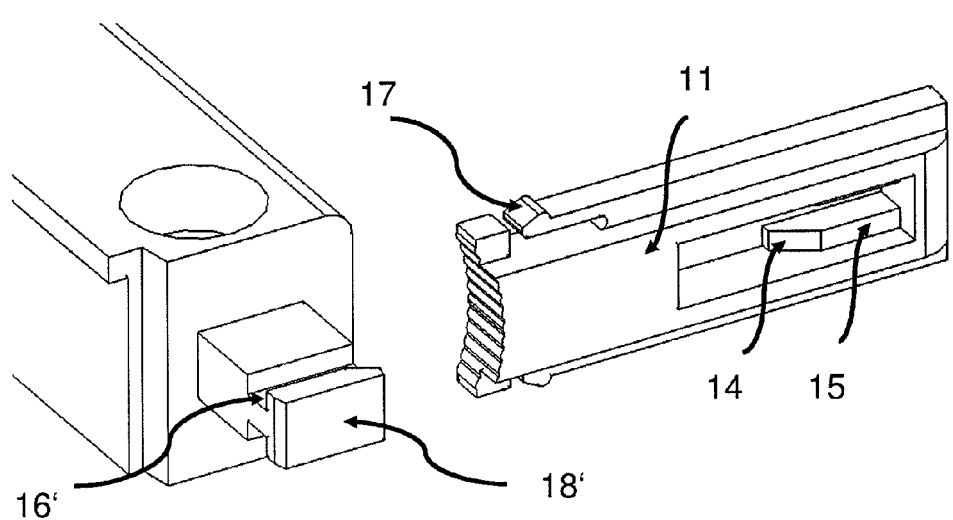
Figure 7:
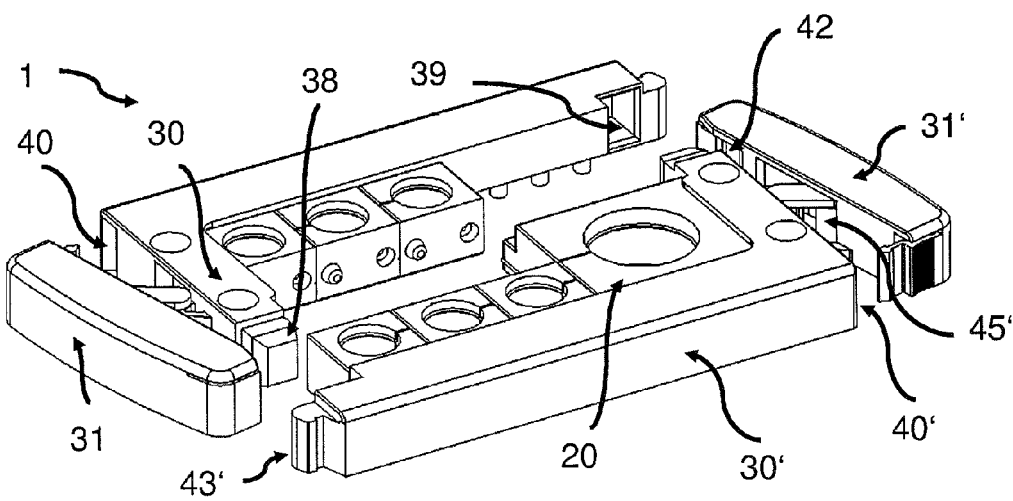
FIG. 7 shows a first perspective schematic illustration of the frame and frame parts according to a second embodiment of the invention during an assembly of frame parts.
Figure 8:
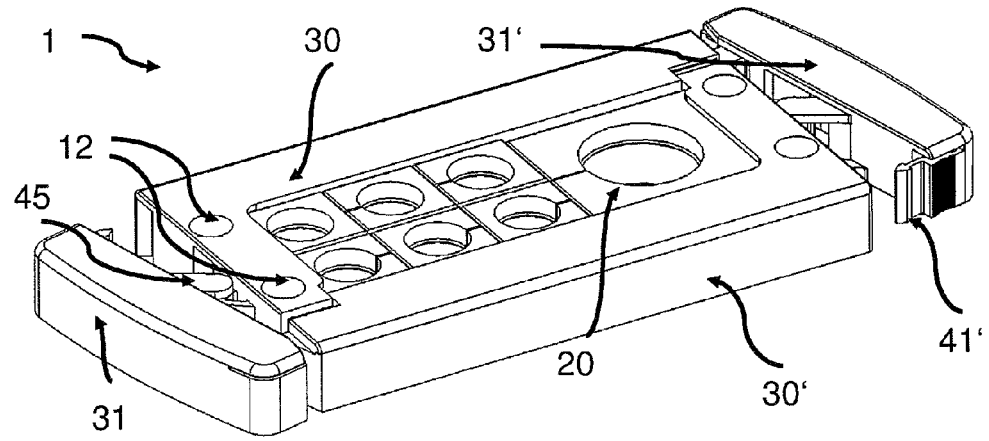
Figure 9:
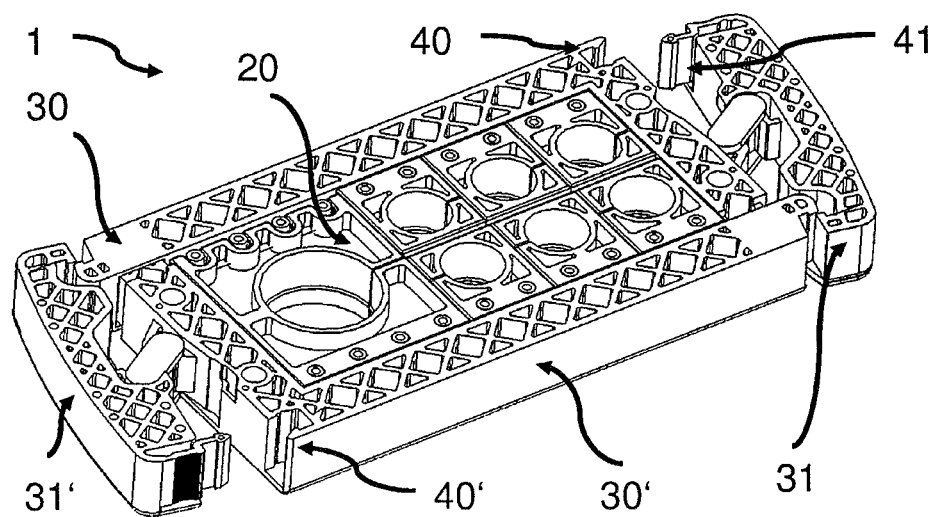

After the actuation has been completed, the frame 1 is constructed from the frame parts 30, 30' and the connection is detachable in reverse order. Such a completed frame 1 is illustrated in FIG. 12. For this purpose a view of a top is illustrated at the bottom of FIG. 12, while a view of the bottom is shown at the top of FIG. 12. As can easily be seen in FIG. 4, the frame parts may also have additional recesses which are embodied such that the stability and density of the frame is ensured while simultaneously saving material.

With the embodiment according to the invention it is achieved that a reliable connection of frame parts is possible. The connection itself is detachable. Furthermore, no tools are required for making the connection such that the ease of installation and disassembly is significantly improved as opposed to the solutions according to prior art.

Furthermore, the frame parts 30 and 30' may be embodied identically such that only one production process is necessary in a cost-effective manner.

In the second embodiment the locking members 31, 31' are embodied as latch fasteners. As soon as the frame parts 30, 30' have been guided inside of each other, the latch fastener—as shown in FIG. 11 by the arrows—may be pivoted.

With the pivoting the locking member 31, 31' is thereby guided through the joint 45, 45' and through the projection 40, 40', which is initially received in the recess 41, 41' in a movable manner.

With the pivoting action pressure is built up such that other frame parts 30, 30' each are drawn on. Contrary to FIG. 12, it is clear in FIG. 11 that the rotational axis migrates in the recess 40, 40' during the pivoting action.

It goes without saying that pivoting the locking member 31, 31' about the projection 43 in the recess 42' will lead to the same result. In this form of pivoting the locking member 31, 31' is guided through the joint 45, 45' and through the projection 43, 43', which is initially received in the recess 42, 42' in a movable manner.

For this purpose the projection 40 and the recess 41 serve to secure the latch fastener 31 in 2 positions (FIG. 11/FIG. 12), while the direction is essentially predetermined by the joint 45, the projection 42, and the recess 43.

In this embodiment of the locking member 31, 31' as a latch fastener, a dead center may be provided, for example, before reaching the end position (FIG. 12). The maximum amount of force is exerted onto the articulation formed by the latch fastener and the remaining frame part at the dead center. If the dead center is exceeded in the direction of the end position, the force is again reduced. In this manner a reliable detachable tension is ensured, as force is again required for detaching such that the dead center is again (now in the other direction) overcome.

This area latches the latch fastener 31 supported on the frame part 30 via the joint to the other frame part 30'.

The connection of the frame parts 30, 30' is achieved by means of applying tension on the latch fasteners 31, 31', and will not independently be released by exceeding the dead center. In this regard the latch 40, 41 is intended such that the connection may only be opened by means of the actuation of the latch hook 40, 41. In this manner the frame parts are undetachably held in place.

Furthermore it may be provided that the projections 41, 41' and/or the projections 43, 43' provide latching functions together with the respective recesses 40, 40' and/or 42, 42, thus enabling an additional security feature.

In the second embodiment illustrated the frame parts 30, 30' each have their own locking recess 41, 41' and a locking projection 40, 40' for locking.

The frame, or the frame parts 10, 10'; 30, 30', respectively, of the different embodiments may be manufactured from a plastic material or from metal.

Furthermore, one or more fastening devices 12 may be provided at the frame parts 10, 10'; 30, 30', or at the frame 1, respectively, for the installation on a housing. The same may be embodied as a screw connection, bores for screw connections, or clamping anchors, and the like.

Figure 13:
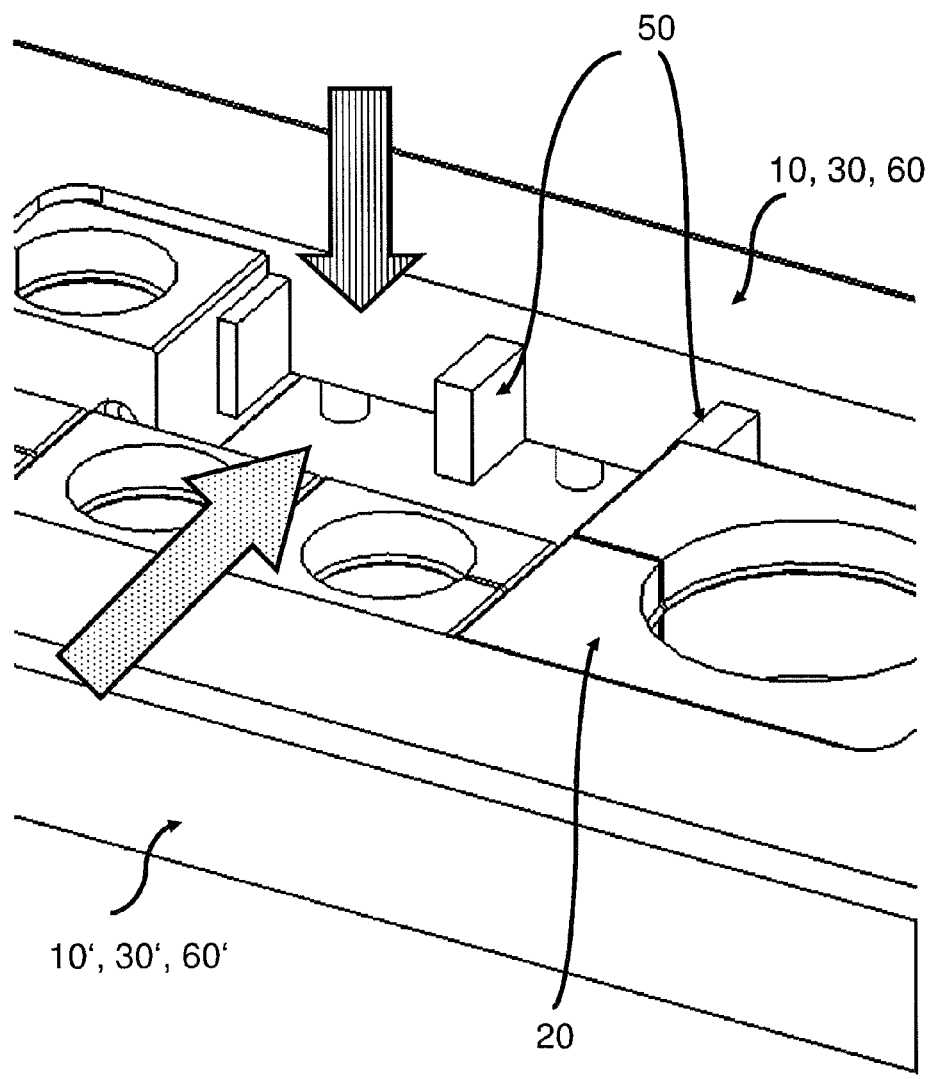

According to another detail—illustrated in FIG. 13—one or more bars 50 may be provided at the frame parts 10, 10'; 30, 30'; 60, 60'.

These bars 50 are embodied such to receive cable feedthroughs 20. For this purpose cable feedthroughs 20 may be received from different directions.

Two of these directions are pointed out in FIG. 13 by means of arrows for better understanding.

A first arrow with line-filling shows a normal direction with regard to a completely assembled frame, another arrow with dot-filling shows a collinear direction with regard to a completely assembled frame.

It goes without saying that these directions indicated by the arrows are shown merely by way of example, and that other directions are indeed also possible.

These bars 50 enable an improved foothold of cable feedthroughs 20 received, and stabilize the cable feedthroughs 20 additionally already in the assembly phase, or also during disassembly, respectively.

Figure 14:
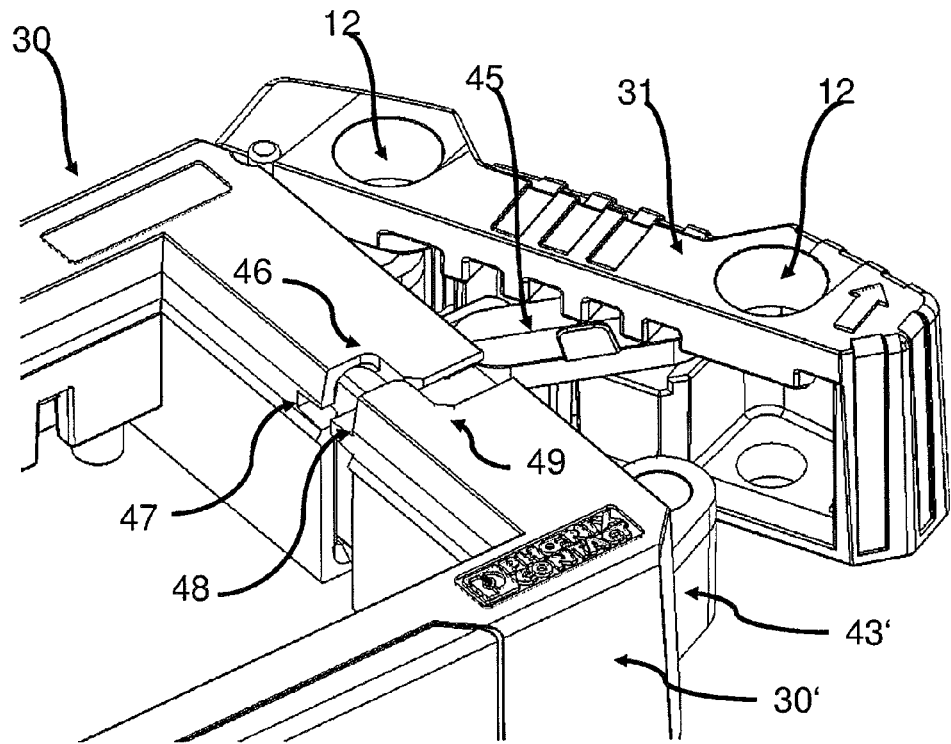

According to an additional detail illustrated in FIG. 14 it may be provided that one or more gear tooth systems 46, 47, 48, 49 are provided at the frame parts 10, 10'; 30, 30'; 60, 60'. As illustrated, these gear tooth systems may be disposed on various surfaces of the frame parts 10, 10'; 30, 30'; 60, 60'. Additional gear tooth systems may also be provided. Due to the reciprocal support of the gear tooth system 46 on 49, or 47 on 48, respectively, a higher torsional stiffness is provided for the frame parts 10, 10'; 30, 30'; 60, 60', in particular, at low material thicknesses. In this manner material usage may be reduced to a minimum, thus enabling a cost-effective manner of production.

Figure 15:
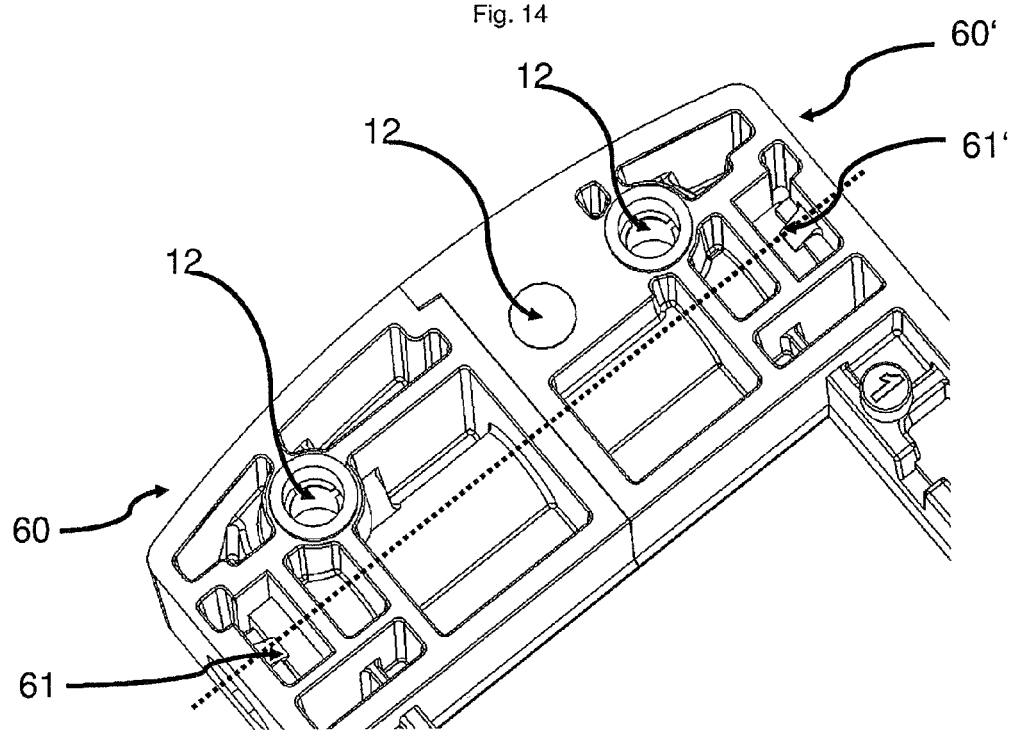

According to another detail explained in connection with FIG. 15, the frame parts 10, 10'; 30, 30'; 60, 60' may additionally or alternatively also have receiving recesses for the locking members 61, 61'. As illustrated in FIG. 15, these receiving recesses may also be embodied such that both a nut may be received, and a screw may be inserted. The resulting screw axis is indicated as a dotted line. In the layout illustrated it may be flexibly decided at the location, whether screws may be placed from one or from the other side. This is of advantage particularly in case of narrow spatial conditions, since the installation must now be adjusted according to the work space available.

Figure 16:
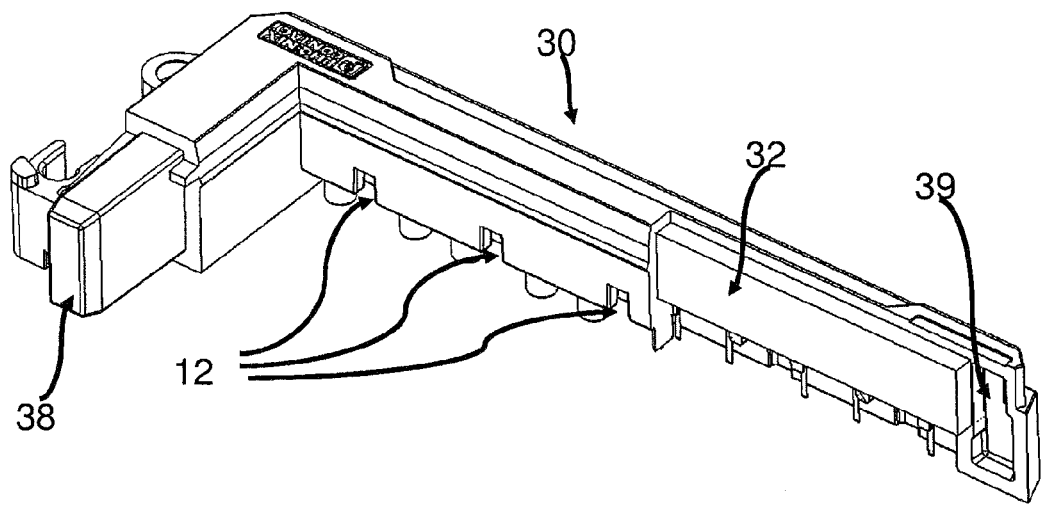

According to a further detail illustrated in FIG. 16, it may be provided that the frame parts 10, 10'; 30, 30'; 60, 60' have a stiffening member 32, at least in sections. This stiffening member 32 may be manufactured, for example, from a metal material. In an advantageous production method the stiffening member 32 is already incorporated into the frame parts 10, 10'; 30, 30'; 60, 60' during the production thereof. In a particularly advantageous manner this may be realized during injection molding. For this purpose the stiffening member 32 is heated, and partially enclosed during the injection molding of the frame parts 10, 10'; 30, 30'; 60, 60'. By using one or more stiffening members 32, a higher torsional stiffness is provided for the frame parts 10, 10'; 30, 30'; 60, 60', in particular at low material thicknesses. In this manner material usage may be reduced to a minimum, thus enabling cost-effective production.

Furthermore, the frame parts 10, 10'; 30, 30'; 60, 60'—as indicated in FIGS. 14 and 15—may also be symmetrical.

Additionally, as shown in FIG. 14, the frame parts 10, 10'; 30, 30'; 60, 60' may also have a U-shaped profile.

| List of Reference Symbols | |
| --- | --- |
| Frame | 1 |
| Frame part | 10, 10', 30, 30', 60, 60' |
| Locking members | 11, 11', 31, 31' |
| Recess for locking members | 61, 61' |
| Fastening devices | 12 |
| Recess | 13' |
| Stop surface | 14 |
| Holding projection | 15 |
| Recess | 16' |
| Spring arm | 17 |
| Projection | 18, 18', 38, 38' |
| Recess | 19, 19', 39, 39' |
| Cable feedthrough | 20 |
| Stiffening member | 32 |
| Projection | 40, 40', 42, 42' |
| Recess | 41, 41', 43, 43' |
| Joint | 45, 45' |
| Gear tooth system | 46, 47, 48, 49 |
| Bar | 50 |

The invention claimed is:

1. A frame (1) for cable feedthrough systems, comprising a first frame part (10, 30, 60) and a second frame part (10', 30', 60'), wherein
each frame part (10, 10', 30, 30'; 60, 60') has a recess (19, 19', 39, 39') and a projection (18, 18', 38, 38'), wherein
the projection (18, 38) of the first frame part (10, 30, 60) is suitably embodied for being inserted into the recess (19', 39') of the second frame part (10', 30', 60'), wherein
the projection (18', 38') of the second frame part (10', 30', 60') is suitably embodied for being inserted into the recess (19, 39) of the first frame part (10, 30, 60), wherein
the first frame part (10, 30, 60) further has a locking member (11, 31) and the second frame part (10', 30', 60') further has a locking member (11', 31'), wherein
the locking members (11, 11', 31, 31') in the assembled state may detachably connect the first frame part (10, 30, 60) with the second frame part (10', 30', 60'), wherein the locking members (31, 31') have latch fasteners, wherein
the locking members (31, 31') are pivotally mounted on the frame parts (30, 30') with joint (45, 45'), and the locking members (31, 31') each have a recess (42, 42') corresponding with a projection (43, 43') of the other frame part (30, 30');
wherein the frame (1) encloses multiple cable feedthroughs or cable sleeves; and
wherein the locking members (31, 31') are manually actuatable.

2. The frame (1) according to claim 1, characterized in that the first frame part and the second frame part are embodied identically.

3. The frame (1) according to claim 1, characterized in that the frames enable a pre-centering during the assembly.

4. The frame (1) according to claim 1, characterized in that the frame is made from a plastic material or from metal.

5. The frame (1) according to claim 1, characterized in that the frame has fastening devices (12) for an installation on a housing.

6. The frame (1) according to claim 1, characterized in that the locking members (11, 11') lock the projections (18, 18', 38, 38') in the respective recess.

7. The frame (1) according to claim 1, characterized in that the frame parts (30, 30') each have a locking recess (41, 41') that corresponds with a locking projection (40, 40') provided on the locking members (31, 31') of the respective other frame part (30, 30') for locking, wherein the locking recess (41, 41') and the locking projection (40, 40') secure the locking member (31, 31') when interlocked.

8. A frame part (10, 10', 30, 30'; 60, 60') for a frame (1) of a cable feedthrough system, wherein the frame in the assembled state has a first frame part (10, 30) and an equally shaped second frame part (10', 30'), wherein
the frame part (10, 10', 30, 30'; 60, 60') has a recess (19, 19', 39, 39') and a projection (18, 18', 38, 38'), wherein
the projection (18, 18', 38, 38') of the frame part is suitably embodied for being inserted into a recess (19, 19', 39, 39') of a second frame part, wherein
the recess (19, 19', 39, 39') of the frame part is suitably embodied for receiving a projection (18, 18', 38, 38') of the second frame part, wherein
the frame part (10, 10', 30, 30'; 60, 60') further has a locking member (11, 11', 31, 31'), wherein the locking members (11, 11', 31, 31') in the assembled state may detachably connect the first frame part (10, 30, 60) with the second frame part (10', 30', 60;), wherein the locking member (31, 31') has a latch fastener, wherein
the locking members (31, 31') are pivotally mounted on the frame parts (30, 30') with joint (45, 45'), and the locking members (31, 31') each have a recess (42, 42') corresponding with a projection (43, 43') of the other frame part (30, 30');
wherein the frame (1), when assembled, encloses multiple cable feedthroughs or cable sleeves; and
wherein the locking members (31, 31') are manually actuatable.

9. The frame part (10, 10', 30, 30'; 60, 60') according to claim 8, characterized in that the frame part enables a pre-centering during the assembly of the frame.

10. The frame part (10, 10', 30, 30'; 60, 60') according to claim 8, characterized in that the frame part is produced from a plastic material or from metal.

11. The frame part (10, 10', 30, 30'; 60, 60') according to claim 8, characterized in that the frame part has fastening devices (12) for the installation on a housing.

12. The frame part (10, 10', 30, 30'; 60, 60') according to claim 8, characterized in that the locking member (11, 11') locks the projection (18, 18') of the second frame part in the recess.

13. The frame part (10, 10', 30, 30'; 60, 60') according to claim 8, characterized in that the frame part has a separate recess (40, 40') and a separate projection (41, 41') for locking the same with the second frame part, which undetachably hold the frame parts in the locked state.

14. The frame part (10, 10', 30, 30'; 60, 60') according to claim 8, characterized in that the frame part further has bars (50), wherein the bars (50) are embodied such that they are suitable for receiving cable feedthroughs (20) from various directions.

15. The frame part (10, 10', 30, 30'; 60, 60') according to claim 8, characterized in that the frame part has one or more gear tooth systems (46, 47, 48, 49).

16. The frame part (10, 10', 30, 30'; 60, 60') according to claim 8, characterized in that the frame part further has at least one receiving recess for receiving locking members (61, 61').

17. The frame part (10, 10', 30, 30'; 60, 60') according to claim 8, characterized in that the frame part further has at least one stiffening member (32).

18. A frame (1) for cable feedthrough systems, comprising a first frame part (10, 30, 60) and a second frame part (10', 30', 60'), wherein each frame part (10, 10', 30, 30'; 60, 60') has a recess (19, 19', 39, 39') and a projection (18, 18', 38, 38'), wherein the projection (18, 38) of the first frame part (10, 30, 60) is suitably embodied for being inserted into the recess (19', 39') of the second frame part (10', 30', 60'), wherein the projection (18', 38') of the second frame part (10', 30', 60') is suitably embodied for being inserted into the recess (19, 39) of the first frame part (10, 30, 60), wherein the first frame part (10, 30, 60) further has a locking member (11, 31) and the second frame part (10', 30', 60') further has a locking member (11', 31'), wherein the locking members (11, 11', 31, 31') in the assembled state may detachably connect the first frame part (10, 30, 60) with the second frame part (10', 30', 60'), wherein the locking members (31, 31') have latch fasteners, wherein the locking members (31, 31') are pivotally mounted on the frame parts (30, 30') with joint (45, 45'), and the locking members (31, 31') each have a recess (42, 42') corresponding with a projection (43, 43') of the other frame part (30, 30'); and the frame (1) is characterized in that the frame parts (30, 30') each have a locking recess (41, 41') that corresponds with a locking projection (40, 40') provided on the locking members (31, 31') of the respective other frame part (30, 30') for locking, wherein the locking recess (41, 41') and the locking projection (40, 40') secure the locking member (31, 31') when interlocked.

\* \* \* \* \*